W. B. HALL AND T. MERRILL.
TRACTOR.
APPLICATION FILED DEC. 1, 1920.
1,387,708.
Patented Aug. 16, 1921.
3 SHEETS—SHEET 1.
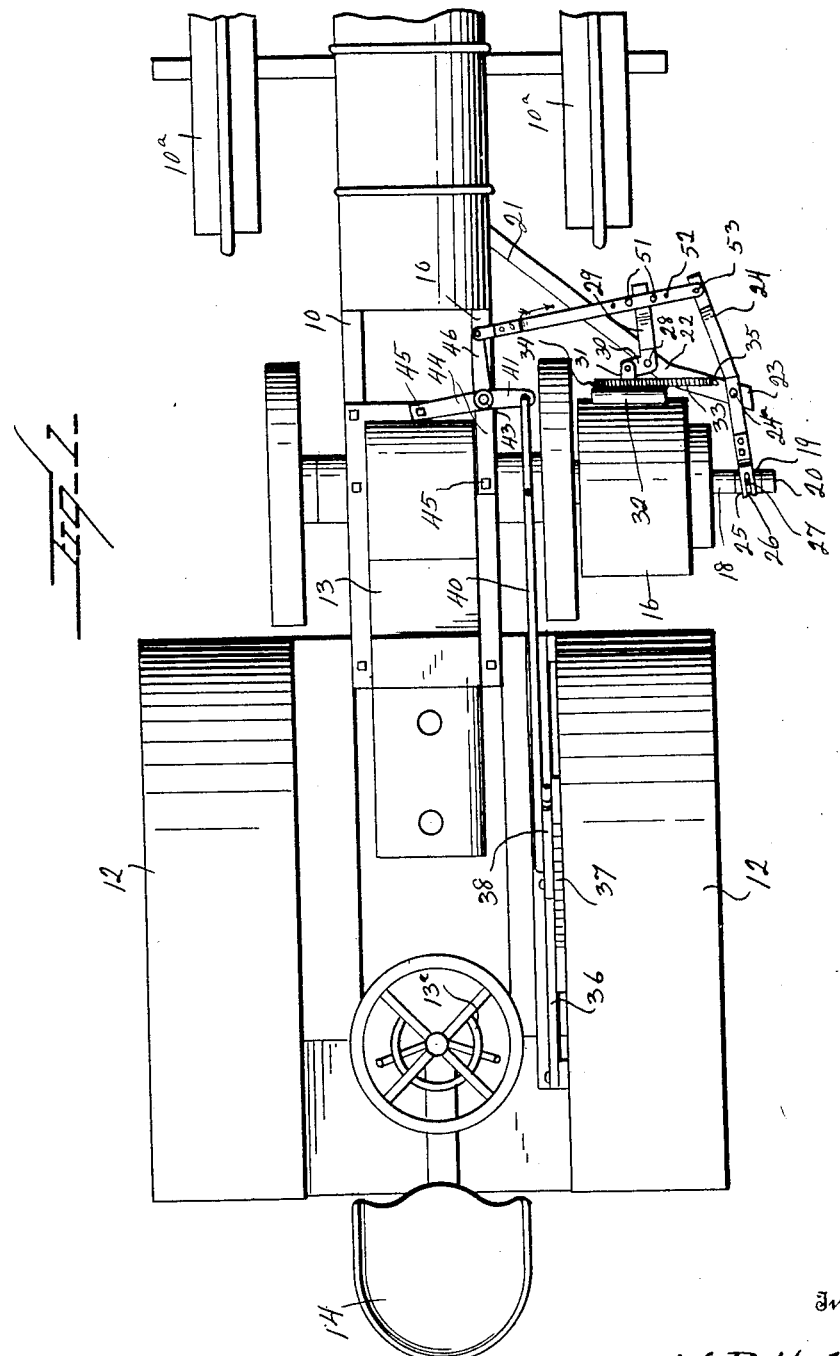
Inventors
W. B. Hall and
T. Merrill.
By Watson E. Coleman
Attorney

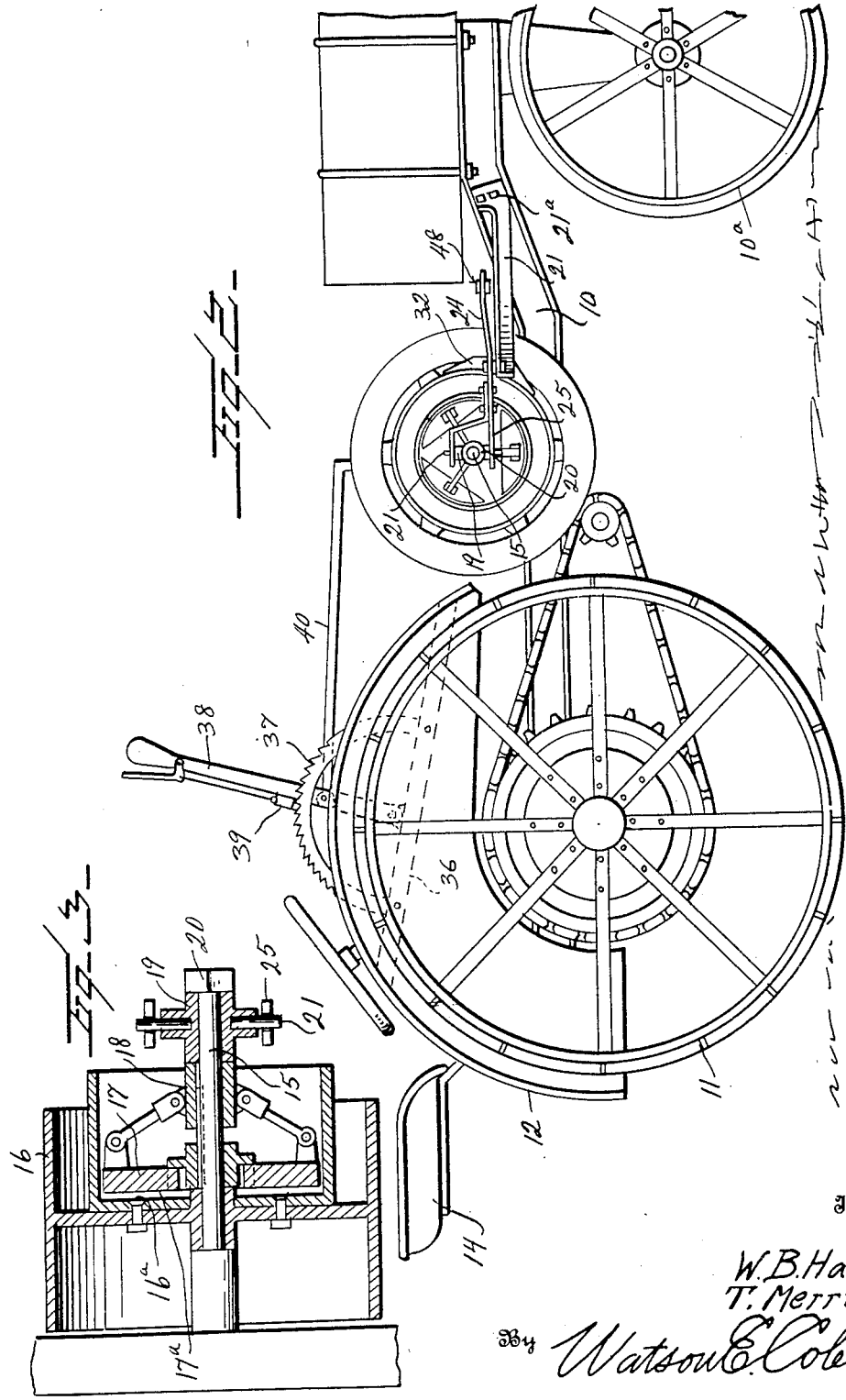

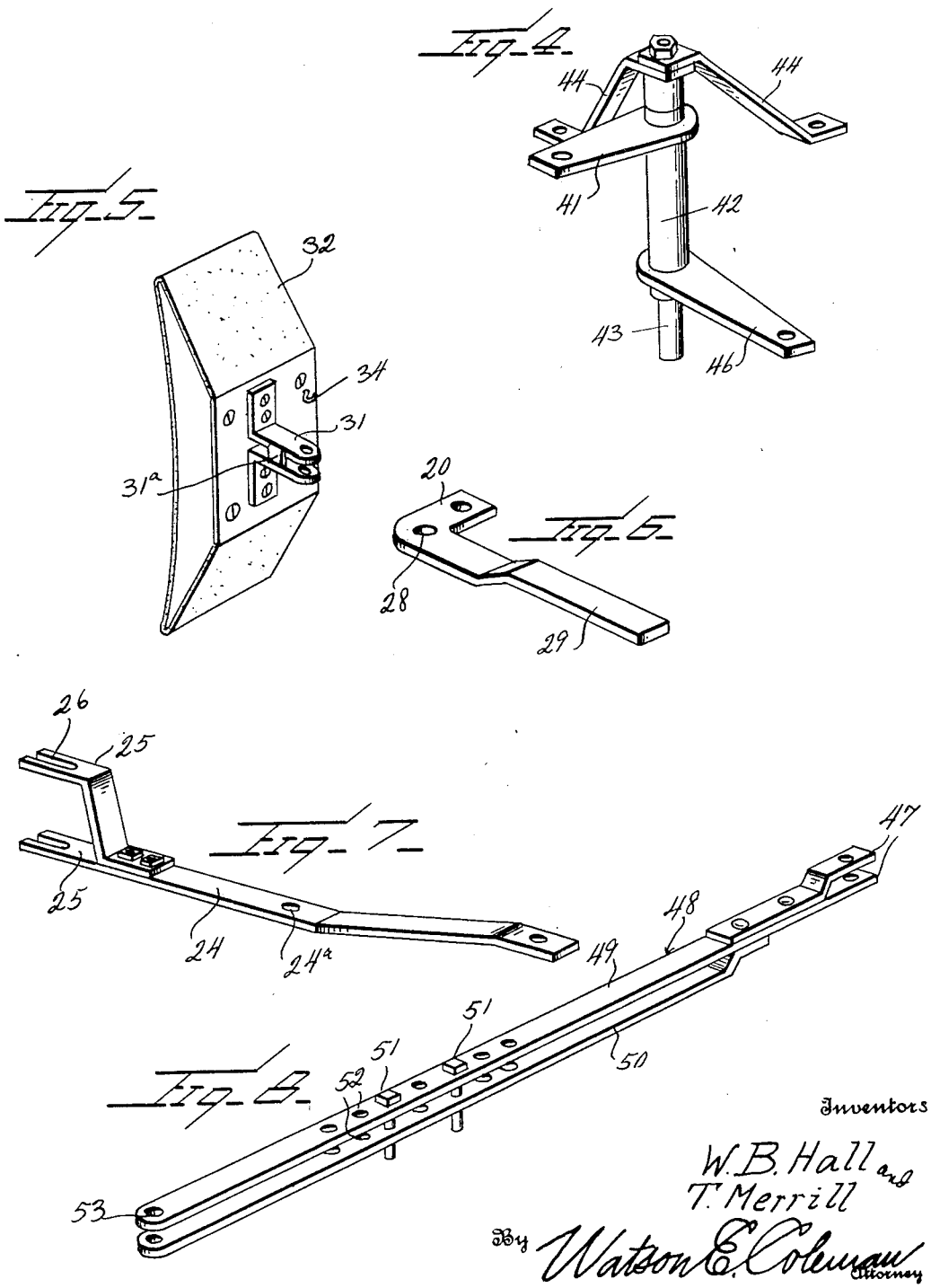

UNITED STATES PATENT OFFICE.

WALTER B. HALL AND TOM MERRILL, OF STRATTON, NEBRASKA.

TRACTOR.

1,387,708.                    Specification of Letters Patent.    Patented Aug. 16, 1921.

Application filed December 1, 1920. Serial No. 427,536.

*To all whom it may concern:*

Be it known that we, WALTER B. HALL and TOM MERRILL, citizens of the United States, residing at Stratton, in the county of Hitchcock and State of Nebraska, have invented certain new and useful Improvements in Tractors, of which the following is a specification, reference being had to the accompanying drawings.

This invention relates to tractors and more particularly to certain improvements in a tractor whereby the drive pulley usually employed when the tractor is used as a power engine to drive the thresher and similar implements may be controlled at a point adjacent the control for the engine.

Many tractors now in use and particularly those tractors of the type illustrated by that known as the Titan 10-20 have mounted upon the crank shaft of the engine thereof a loose pulley embodying a clutch mechanism which is locked against rotation with relation to the shaft by means of an operating hand wheel associated with the pulley. Due to the vibration to which the clutch mechanism and pulley are subjected, the clutch mechanism is often accidentally disengaged with the resulting stoppage of the drive and choking of the thresher. Where the pulley is being employed to drive the thresher, such accidental stoppage is time-consuming in that a thresher which is beind fed, if stopped during the feeding, is extremely difficult to start again and places an extremely heavy load upon the engine. Furthermore, these operating hand wheels being situated at a point remote from the engine control renders it impossible for one man to efficiently shut down the power plant in that if the pulley is disengaged from the shaft, the engine has a tendency to race, and as is well known to those familiar with the art, it is extremely unwise to shunt down an engine under load, as stopping the engine is generally in such case so abrupt as to place an undue strain upon the parts thereof.

An important object of the invention is, therefore, to provide means for clutching and unclutching a pulley from a point adjacent the driver's seat and accordingly adjacent the engine control of the tractor.

A further object of the invention is to provide means for simultaneously clutching the pulley and for locking the pulley against rotation.

A still further object of the invention is to provide a common means for accomplishing the last named function.

Other objects and advantages of the invention will become apparent throughout the course of the following description:

In the accompanying drawings, wherein is shown for the purpose of illustration a preferred embodiment of our invention, and wherein like reference characters designate like parts throughout:

Figure 1 is a plan view of a tractor embodying our invention;

Fig. 2 is a side elevation thereof;

Fig. 3 is a sectional, partially diagrammatic view of the type of clutch pulley usually employed;

Fig. 4 is a perspective of the bell crank lever and mounting therefor employed in the construction of our invention;

Fig. 5 is a perspective of the brake employed;

Fig. 6 is a perspective of the operating arm therefor;

Fig. 7 is a perspective of the operating arm of the clutch mechanism, and

Fig. 8 is a perspective of the actuating arm for the brake and clutch arms.

Referring now more particularly to the drawings, the numeral 10 indicates the side frames of a tractor supported forwardly by steering wheels 10ª and rearwardly by driving wheels 11 in the usual manner. The side frames 10 form a support for mud guards 12 covering the drive wheels and for an engine 13. The engine 13 is controlled from a point adjacent the driver's seat 14 in the usual manner, as indicated at 13ª.

The numeral 15 indicates a shaft driven by the engine and preferably forming a continuation of the crank shaft thereof, which shaft usually extends transversely of the tractor and forwardly of the drive wheels thereof. This shaft has rotatably mounted thereon a pulley 16 and is provided with means thereon whereby the pulley 16 may be held against rotation with relation to the shaft, in the present instance being diagrammatically illustrated, consisting of a clutch member 17 having a friction face 17ª adapted to engage with a coacting friction face 16ª formed upon the pulley. The member 17ª is held against rotation with relation to the shaft and is shiftable longitudinally of the shaft to bring the clutch members 16ª and 17ª into engagement through medium of the shifting block 18. In the usual construction, the shifting block 18 is actuated by means of a hand wheel, not shown. In accordance with our invention, we have slidably and rotatably mounted upon the shaft 15 the member 19 adapted to engage against the member 18 to shift the same and bring the members 17ª and 16ª into engagement, the movement of the member 19ª outwardly upon the shaft being limited by an enlargement or stop member 20.

The numeral 21 indicates a brace secured to one of the side bars 10, as at 21ª. This brace or bracket 21 extends outwardly from the side bars and embodies a portion 22 extending adjacent the periphery of the pulley 16 and has its outer end extending beyond the outer edge of the pulley, as at 23. To this outer end 23 a lever 24 is pivotally mounted intermediate its ends, as at 24ª. One end of the lever 24 extends adjacent the shaft 15 and is provided with a forked end, forming arms 25 extending to the opposite sides of the shaft which arms are slotted longitudinally, as at 26, for the reception of pins 27 upstanding from the actuating member 19.

Pivotally mounted upon the brace 21 and portion 22 thereof, as at 28, is a bell crank lever embodying a long arm 29 and a short arm 30 which short arm 30 substantially parallels the face of the pulley 16. The short arm 30 is received between and pivotally connected to, ears 31 formed upon or secured to a brake 32. The upper ear 31 of the brake 32 is provided with a downwardly extending portion 31ª adapted to abut against the arm 30 to limit the rotation of the brake 32 thereabout in one direction. A spring 33 has one end engaged with the brake 32, as at 34, and the opposite end engaged with the brace 21, as at 35, in such a manner as to cause the downwardly extending portion 31 to normally remain in engagement with the arm 30. It will be seen that by shifting the long arm 29 of the bell crank lever transversely of the tractor, the brake 32 is moved into or out of engagement with the pulley 16. The spring 33 so positions the brake that it will properly engage against the face of the pulley permitting a certain amount of movement to allow the brake face to flatly engage the pulley as the pressure is increased.

The numeral 36 designates a bar preferably secured to one of the mud guards 12 at its ends and which forms a support for the segment 37. The lever 38 coacts with the segment 37 and embodies the usual locking dog 39 for engagement with the notches thereof. A link 40 has its rear end pivotally connected to the lever 38 and its forward end directed through an opening formed in the arm 41 which arm extends transversely of the tractor and is formed upon a sleeve 42. This sleeve is rotatably mounted upon a vertical shaft 43 preferably mounted upon one of the side members 10. From the upper end of the shaft 43 braces 44 extend to engage the base of the engine 70 and are preferably held in position by bolts 45 forming a normal part of the construction of the engine. The sleeve 42 is likewise provided with a second arm 46 which arm extends longitudinally of the tractor and is of slightly greater length than preferably the arm 41. An inspection of the drawings, and particularly Fig. 4 thereof, will render obvious that the sleeve 41 and arms 42 and 46 thereof form a bell crank lever, the arms of which oscillate in a horizontal plane.

The forward end of the arm 46 extends intermediate and is pivotally connected to branches 47 of an actuating arm 48. This actuating arm embodies a pair of spaced members 49 and 50. Intermediate the ends of the members 49 and 50, spaced stop members 51 are directed through the arms, these stop members interchangeably engaging in the openings 52 formed in the arms 49 and 50. Intermediate the arms 49 and 50 and the stop members 51, the long arm of the brake operating lever 29 extends. The outer ends of the arms 49 and 50 receive therebetween and have pivotally connected thereto, as at 53, the free end of the lever 24.

An inspection of the drawings, and more particularly Fig. 1 thereof, will render obvious that if the operating member 48 is shifted longitudinally in the direction of the arrow, the member 19 is shifted inwardly, causing the clutch faces 16ª and 17ª to be brought into engagement and simultaneously the brake 32 is withdrawn from engagement with the pulley 16 releasing the pulley for motion. Movement in the opposite direction disengages the clutch faces and engages the pulley.

It will, therefore, be obvious that by mechanism constructed in accordance with our invention, the operation and control of the drive pulley is greatly facilitated and permits of simultaneous control of the engine; and it will likewise be obvious that the construction of the same as hereinbefore set forth is capable of some change without materially departing from the spirit of my invention. We, accordingly, do not limit ourselves to the specific construction as hereinbefore set forth, except as so limited by the sub-joined claims.

What we claim is:

1. The combination with a tractor embodying the usual driver's seat, power unit, control for the power unit adjacent the driver's seat, a shaft driven by the power unit, a pulley rotatably mounted upon the shaft and a member when shifted in one direction to hold the pulley against rotation, of a brake engaging said pulley, a bracket secured to the frame of the tractor and embodying a portion extending adjacent the periphery of the pulley, a lever pivotally mounted upon said bracket, a shiftable member operated by the lever when moved in one direction for shifting the first named member to hold the pulley against rotation with relation to the shaft, a bell crank lever pivotally mounted upon the portion of said bracket adjacent the periphery of the pulley and embodying an arm extending in a direction away from said lever to which said brake is pivotally connected, a bar connecting said lever and the other arm of said bell crank lever and means for shifting said arm disposed adjacent the driver's seat.

2. The combination with a tractor embodying the usual driver's seat, power unit, control for the power unit adjacent the driver's seat, a shaft driven by the power unit, a pulley rotatably mounted upon the shaft and a member when shifted in one direction to hold the pulley against rotation, of a brake engaging said pulley, a bracket secured to the frame of the tractor and embodying a portion extending adjacent the periphery of the pulley, a lever pivotally mounted upon said bracket, a shiftable member operated by the lever when moved in one direction for shifting the first named member to hold the pulley against rotation with relation to the shaft, a bell crank lever pivotally mounted upon the portion of said bracket adjacent the periphery of the pulley and embodying an arm extending in a direction away from said lever to which said brake is pivotally connected, means limiting the movement of the brake with relation to said arm in one direction, a bar connecting said lever and the other arm of said bell crank lever and means for shifting said arm disposed adjacent the driver's seat.

3. The combination with a tractor embodying the usual driver's seat, power unit, control for the power unit adjacent the driver's seat, a shaft driven by the power unit, a pulley rotatably mounted upon the shaft and a member when shifted in one direction to hold the pulley against rotation with relation to the shaft, of a brake engaging said pulley, a bracket secured to the frame of the tractor and embodying a portion extending adjacent the periphery of the pulley and embodying an arm extending in a direction away from said lever to which said bracket is pivotally connected, means limiting the movement of the brake with relation to said arm in one direction, means for yieldably urging the brake in said direction, a bar connecting said lever and the other arm of said bell crank lever and means for shifting said arm disposed adjacent the driver's seat, the connection between the last named bell crank lever and said bar being adjustable.

4. The combination with a tractor embodying the usual driver's seat, power unit, control for the power unit adjacent the driver's seat, a shaft driven by the power unit, a pulley rotatably mounted upon the shaft and a member when shifted in one direction to hold the pulley against rotation, of a brake engaging said pulley, a bracket secured to the frame of the tractor and embodying a portion extending adjacent the periphery of the pulley, a lever pivotally mounted upon said bracket, a shiftable member operated by the lever when moved in one direction for shifting the first named member to hold the pulley against rotation with relation to the shaft, a bell crank lever pivotally mounted upon the portion of said bracket adjacent the periphery of the pulley and embodying an arm extending in a direction away from said lever to which said brake is pivotally connected, a bar connecting said lever and the other arm of said bell crank lever and means for shifting said arm disposed adjacent the driver's seat, said bar embodying a pair of spaced members intermediate which the last named arm of said bell crank extends and stop members disposed at opposite sides of said last named arm and adjustable longitudinally of said bar.

5. The combination with a tractor embodying the usual driver's seat, power unit, control for the power unit adjacent the driver's seat, a shaft driven by the power unit, a pulley rotatably mounted upon the shaft and a member when shifted in one direction to hold the pulley against rotation, of a brake engaging said pulley, a bracket secured to the frame of the tractor and embodying a portion extending adjacent the periphery of the pulley, a lever pivotally mounted upon said bracket, a shiftable member operated by the lever when moved in one direction for shifting the first named member to hold the pulley against rotation with relation to the shaft, a bell crank lever pivotally mounted upon the portion of said bracket adjacent the periphery of the pulley and embodying an arm extending in a direction away from said lever to which said brake is pivotally connected, a bar connecting said lever and the other arm of said bell crank lever and means for shifting said arm disposed adjacent the driver's seat, said pivotal connection embodying an ear secured to said brake, an angular extension formed on said ear and engaging said arm to limit the movement of the brake with respect to the arm in one direction, means for resiliently urging the brake in said direction.

6. The combination with a tractor embodying the usual driver's seat, power unit, control for the power unit adjacent the driver's seat, a shaft driven by the power unit, a pulley rotatably mounted upon the shaft and a member when shifted in one direction to hold the pulley against rotation, of a brake engaging said pulley, a bracket secured to the frame of the tractor and embodying a portion extending adjacent the periphery of the pulley, a lever pivotally mounted upon said bracket, a shiftable member operated by the lever when moved in one direction for shifting the first named member to hold the pulley against rotation with relation to the shaft, a bell crank lever pivotally mounted upon the portion of said bracket adjacent the periphery of the pulley and embodying an arm extending in a direction away from said lever to which said brake is pivotally connected, a bar connecting said lever and the other arm of said bell crank lever and means for shifting said arm disposed adjacent the drivers seat comprising a segment and a lever organization disposed adjacent the driver's seat, a bell crank lever pivotally mounted upon the frame of the tractor and to one arm of which said lever is pivotally connected, and a link connecting the other arm thereof with the lever of the segment and lever organization.

In testimony whereof we hereunto affix our signatures.

WALTER B. HALL.
TOM MERRILL.